United States Patent [19]

Cole

[11] Patent Number: 5,043,380

[45] Date of Patent: Aug. 27, 1991

[54] METAL CONTAINER COATING COMPOSITIONS COMPRISING AN ACRYLIC POLYMER LATEX, MELAMINE FORMALDEHYDE RESIN AND AN PHENOL FORMALDEHYDE RESIN

[75] Inventor: Harold F. Cole, Racine, Wis.

[73] Assignee: The Dexter Corporation, Windsor Locks, Conn.

[21] Appl. No.: 604,678

[22] Filed: Oct. 29, 1990

[51] Int. Cl.$^5$ .................. G08L 61/10; G08L 61/28
[52] U.S. Cl. ............................ 524/510; 524/509
[58] Field of Search ............................ 524/510, 509

[56] References Cited

U.S. PATENT DOCUMENTS

| | | | |
|---|---|---|---|
| 2,873,211 | 2/1959 | Roeser | 117/211 |
| 3,007,887 | 11/1961 | Essig | 260/29.6 |
| 3,037,963 | 6/1962 | Christenson | 260/72 |
| 3,117,693 | 1/1964 | Vogel | 220/64 |
| 3,231,533 | 1/1966 | Garrett et al. | 260/29.6 |
| 3,247,139 | 4/1966 | Christenson et al. | 260/21 |
| 3,251,793 | 5/1966 | Vogel | 260/27 |
| 3,347,700 | 10/1967 | Gloyer et al. | 117/97 |
| 3,845,023 | 10/1974 | Dalibor | 260/80.73 |
| 3,860,549 | 1/1975 | Sekmakas | 260/29.6 TA |
| 3,922,451 | 11/1975 | Anschutz et al. | 428/35 |
| 3,991,216 | 11/1976 | Christenson et al. | 426/131 |
| 4,065,415 | 12/1977 | Christenson et al. | 260/17.4 SG |
| 4,065,416 | 12/1977 | Christenson et al. | 260/17.4 SG |
| 4,097,438 | 6/1978 | Christenson et al. | 260/29.4 UA |
| 4,195,006 | 3/1980 | Brown et al. | 260/29.6 TA |
| 4,272,621 | 6/1981 | McFadden et al. | 525/355 |
| 4,289,674 | 9/1981 | Christenson et al. | 260/29.6 NR |
| 4,335,829 | 6/1982 | Christenson et al. | 524/813 |
| 4,339,365 | 7/1982 | Becher et al. | 523/400 |

FOREIGN PATENT DOCUMENTS

| | | |
|---|---|---|
| 251994 | 5/1964 | Australia . |
| 264988 | 2/1966 | Australia . |
| 766103 | 8/1967 | Canada . |

Primary Examiner—Joseph L. Schofer
Assistant Examiner—Jeffrey T. Smith
Attorney, Agent, or Firm—Marshall, O'Toole, Gerstein, Murray & Bicknell

[57] ABSTRACT

Water borne, water dilutable metal can coating compositions containing (A) an acrylic polymer latex including an alkyloxymethylacrylamide or -methacrylamide monomer, (B) a melamine/formaldehyde resin, (C) an alkanolamine treated phenol/formaldehyde resin, (D) a lubricant and (E) a defoamer in a water or water/organic solvent mixture are provided. These compositions cure between 15 seconds and 1 minute at moderate can coating cure temperature and permit faster can coating machine speeds on Rutherford can coating machines.

8 Claims, No Drawings

METAL CONTAINER COATING COMPOSITIONS COMPRISING AN ACRYLIC POLYMER LATEX, MELAMINE FORMALDEHYDE RESIN AND AN PHENOL FORMALDEHYDE RESIN

FIELD OF THE INVENTION

This invention relates to coating compositions for metal containers intended for packaging beverage and food products. More particularly, this invention provides processable waterborne, EPA and FDA compliant, metal container coating compositions for containers which are intended to hold beverages such as beer, soft carbonated drinks and food products. Such containers are required to maintain a high lubricity, low coefficient of friction, non-coloring, high gloss and high clarity can appearance surface during the packaging process where the cans will be subjected to post-coating high-temperature pasteurization and/or sterilization processes in retort (pressure cooker-type) waters that vary in pH from about 5 to about 10.5. In addition, the coating must be capable of withstanding oxidative attack over a wide variety of temperature and atmospheric conditions for relatively long periods of time (good shelf life).

BACKGROUND OF THE INVENTION

Metal containers for foods and beverages are generally made from aluminum, tin-free steel, blackplate and tinplate steel, (which is cold rolled steel sheet coated with a thin layer of tin). Because such metal containers are subject to air oxidation or rusting and to corrosion caused during the pasteurization and sterilization of the beer, soda pop, and various food products which are packaged in such containers, organic reactant polymer coating compositions are used to protect the metal from chemical attack and to protect the food products from the deleterious byproducts of chemical attack. Due to their potential contact with food products, such coatings present additional problems of toxicology and taste considerations.

Christenson et al. U.S. Pat. No. 4,097,438, as well as the patent references cited therein, refer to some of the problems of can coating for beverage and food product operations, and disclose water-based coating compositions for use as coatings for metal containers intended for beverage packages. In the Christenson '438 patent, the polymer is made in the absence of a mercaptan so that the polymer in the coating composition will not influence the taste of the beverage product in the polymer coated can. The Christenson U.S. Pat. No. 3,243,139 refers to can coating composition polymers made with mercaptans. Other of the patents listed in the Christenson '438 patent disclose coating composition polymers made in organic solvent media, but none of such patents recite all of the requirements of this invention.

Brown et al. U.S. Pat. No. 4,195,006 refers to Christenson et al. U.S. Pat. No. 3,991,216 which claims metal containers coated with the compositions claimed in Christenson et al. U.S. Pat. No. 4,065,415, among others, but distinguishes the Christenson '216 and '415 patent compositions in that the Brown et al. '006 patent adds 20 to 45 percent of acrylonitrile or methacrylonitrile monomer to its polymer ingredient of its coating composition, and is thus farther removed from the compositions of this invention.

McFadden U.S. Pat. No. 4,272,621 discloses water thinable coatings compositions of aminoalkylated polymers, polyepoxides and water miscible organic solvents made water soluble by acidification with hydrobromic acid or a mixture of hydrobromic acid and hydrochloric acid to provide improved polymer cure rates, but the McFadden '621 patent does not disclose the components of this invention.

An ideal aqueous coating composition, from the perspective of food and beverage manufacturing would meet the following criteria:
1) formulated from FDA-approved materials,
2) fast curing at low temperatures,
3) high solids,
4) clean, color-free, shiny coating,
5) cured coating should provide tack-free surface with frictional characteristics permitting easy movement in automated can-filling equipment,
6) cured coating should be stable when subjected to high-temperature processing utilized to pasteurize or sterilize foods and beverages,
7) cured coating should be stable when subjected to high temperatures in both acid and basic environments,
8) coating should be capable of adhering to a wide variety of surfaces, including printed and decorated can surfaces,
9) coating should exhibit good shelf life under a variety of atmospheric conditions.

Those in the art would prefer to have can coating polymer compositions that satisfy all of the required test parameters, instead of just some of them as well as permit faster can coating machinery speeds. Quality Control tests are made on cans coated with these compositions and include:

1. Check the can coating gloss and appearance vs. a standard (a previously approved standard batch of these compositions). The coated can should have high gloss and clarity, good wetting and adhesion properties equal to the standard.
2. MEK (methyl ethyl ketone) rubs:
   approximately 50 +/− 10. The actual number is recorded. This test estimates the can coatings degree of cure (reaction).
3. Mobility: The Altek Coefficient of Friction (COF) test results are taken,
   a. <0.07 after wash coat bake.
   b. <0.07 after additional 3 min. @400° F. PMT inside spray coating bake.
   c. <0.08 after additional 10 min. @400° F. TOT overbake.
4. 90 minutes @250° F. Process Resistance test
   a. in Deionized Water
   b. in Deionized Water adjusted to pH 10.5 with sodium hydroxide (NaOH).
   Test can coating against a standard. The coating on the test can should exhibit no delamination or loss of adhesion; can may exhibit slight blush equal to standard in both media.

It is an object and purpose of this invention to provide thermoset organic polymeric metal can coating compositions of this nature that with only slight compositional variation:

(a) can be applied in accordance with known can coating methods such as by wash coat, spray coat, curtain coat, roll coat, or in Rutherford can coating machines at substantially faster can coating line speeds than is possible with prior can coating compositions, (b) will not produce an unacceptable color upon curing and will cure faster at lower bake temperatures, approximately 1 minute at 350° F. PMT to 15 seconds at 400° F. PMT (PMT means peak metal temperature), (c) will be compliant with EPA and FDA regulations in their manufacture and use in can coating operations, and in their association with beverage and food filling operations which follow, to obtain a can coating that upon curing will possess a sufficiently hard polymeric film surface to prevent can rub or contact marks and be sufficiently color-free to make for an acceptably appearing coated can while at the same time said coating will be open or permeable enough to permit the lubricant contained in the coating composition to bloom, migrate or move to the surface of the coating to facilitate a sufficient can mobility property between the coated cans so that the coated cans will move easily relative to each other and the canning equipment without any substantial rub, contact or scratch marks in can processing and beverage and food filling operations, and which cured polymer coating will also have sufficient "process resistance" properties when exposed to the conventional pasteurization and sterilization temperatures and the varied pH conditions ranging from the acid side pH 5 to basic side pH 10.5 associated with waters typically encountered in beverage and food filling operations, without coating degradation to ensure an adequate can appearance and product shelf life.

It is also an object of this invention to provide beverage and food product metal cans and metal substrate therefore coated with compositions of this invention.

SUMMARY OF THE INVENTION

Briefly, this invention provides water dilutable, water-borne, U.S. EPA and FDA compliant, metal container cross-linkable coating compositions comprising a liquid mixture of (a) an amide containing acrylic resin latex,
(b) a melamine/formaldehyde-type cross-linking resin,
(c) a base treated phenol/formaldehyde cross-linking resin,
(d) a polymer coating compatible lubricant, and
(e) a defoamer selected from the group consisting of (1) an alkyl-branched alkynyl diol having from 10 to 20 carbon atoms, and (2) an aliphatic mineral spirits hydrocarbon mixture having from about 10 to 12 isoparaffinic hydrocarbons therein, said can coating compositions containing therein sufficient liquid selected from the group consisting of water and a water/organic liquid solvent mixture to maintain the component (A) to (E) dispersible therein, preferably at a pH between 6.5 and 8.0.

These can coating compositions when applied to metal can surfaces and heated to moderate cure temperature will crosslink sufficiently to provide cured coatings that will meet the above performance test requirements within 15 seconds to 1 minute, depending upon the cure heat temperature.

This invention includes metal containers adapted for packaging beverage and food products having at least one metal can surface thereof coated with an adherent layer of a coating composition herein set forth.

It has been discovered according to this invention how to make metal can coating compositions which satisfy the above test requirements, and which with only minor or dilutional concentration variations can be applied by different can coating methods, and which coating compositions can give faster cure times, at lower temperatures, and which coatings when cured on the cans provide the desired process resistance properties to the cans during subsequent can filling, pasteurization and/or sterilization operations, at pH extremes ranging from pH 5 to 10.5, for use in the beverage and food filling/canning industries. These compositions have enabled the speed-up of can coating operations from 400 cans per minute on a wash coating equipment to 1200 cans per minute on Rutherford can coating machines to obtain cans with cured coatings which pass the above test requirements.

It is contemplated these coating compositions will be used either as such or prepared for shipment at a polymer solids percent by weight of from 10 to 50, the balance being any possibly partially soluble component (A) to (E) above and water or water/organic solvent mixture carrier. Upon arrival at the can coating site or upon preparation for use the composition can be used "as is" or reduced somewhat in concentration for varnish coat application, e.g., by Rutherford can coating machine application methods or the coating composition can be diluted with water up to approximately 1:1 or more by volume before filling the composition into the can coating machinery for wash, spray, curtain or roll coat, applications. A viscosity of the diluted coating composition of about 8 to 12 seconds, as measured by the No. 4 Ford cup viscosity measurement test at standard temperature (77° C.) is generally sought at the beginning of the can coating operation when the composition is applied by the curtain can coating procedures. The varnish coat application methods generally involve application of a more concentrated polymer solids coating composition having a viscosity of from about 20 to 150 seconds, as measured by the No. 4 Ford cup test method. The viscosity of the coating compositions applied by the other mentioned methods would be within this viscosity range.

This invention improves the properties of the hereinabove described compositions to the point that the resulting coated cans pass all of the standard can coatings tests. As a result of using these new can coating compositions of this invention, can coating personnel can now expect to obtain coated cans which will pass all of the above indicated tests and coat cans acceptably at faster can coating application speeds on both Rutherford can coating machines, and on wash or curtain coat machines.

These compositions were designed specifically for and are intended primarily for use in coating the exterior metal can surfaces. However, we contemplate that these compositions can also be used to coat the interior surfaces of metal cans.

DETAILED DESCRIPTION OF THE INVENTION

More particularly, the invention provides water borne, water dilutable polymer combination compositions which are particularly useful for coating metal can surfaces by various application procedures including spray, curtain and roll coat applications, or by varnish can coat application methods which coated cans are intended for the packaging of beverages and food products. These new coating compositions comprise a mixture of (A) from about 10 to about 90 percent by weight of the total solids in the composition of an acrylic polymer latex containing an acrylamide polymer component made by using the following monomeric ingredients:

| INGREDIENTS | PERCENT BY WT. |
|---|---|
| (1) Styrene | 3–10 |
| (2) Ethyl acrylate | 0–20 |
| (3) Butyl acrylate | 0–20 |
| (4) Methyl methacrylate | 5–8 |
| (5) Methacrylic acid | 3–7 |
| (6) $C_1$ to $C_6$ -alkyl-oxymethyl-acrylamide, or -methacrylamide | 0.5–3 | based upon the total materials added to the acrylic polymer latex component, in a liquid medium selected from the group consisting of water and a mixture of water with an organic liquid solvent, to provide from about 30 to 35 percent by weight of nonvolatile materials (NVM) in said polymer latex component, (B) from about 1 to about 50 percent by weight of the total solids in the composition of a melamine/formaldehyde source resin, including a methylated melamine/formaldehyde source resin, (C) from about 0.5 to 50 percent by weight of a base treated phenol/formaldehyde source resin composition, which phenol/formaldehyde resin has a viscosity of 20 seconds maximum using a No. 4 Ford Cup viscosity test method, (D) from about 0.1 to about 10 percent by weight of a coating polymer compatible lubricant uniformly dispersible in the total coating composition, and (E) from about 0.1 to about 5 percent by weight based upon the total solids in the composition of a defoamer material selected from the group consisting of (1) an alkyl branched alkynyl diol having from 10 to 20 carbon atoms and (2) an aliphatic mineral spirits liquid, often called petroleum solvent, having $C_{10}$ to $C_{12}$ -isoparaffinic hydrocarbons, said can coating composition containing therein sufficient liquid selected from the group consisting of water and a water/organic liquid solvent mixture to maintain the components (A) to (E) dispersible therein. It is preferred to maintain the pH of the composition at a pH of from 6.5 to 8.0, more preferably, between 7.0 and 7.6.

A preferred component (A) of the composition of this invention is one in which the acrylic polymer latex component (A) contains about 30 to 35 percent of nonvolatile material and the acrylic polymer thereof is made from about the following proportions of monomers:

6.0 percent, by weight, styrene
3.2 percent, by weight, ethyl acrylate
13.5 percent, by weight, butyl acrylate
3.0 percent, by weight, methyl acrylate
5.0 percent, by weight, methacrylic acid and
1.5 percent, by weight, N-isobutoxymethyl acrylamide The acrylic polymer latex component (A) of the composition of this invention can be any known can coating acrylic polymer. Such polymers are usually prepared from alpha, beta olefinically unsaturated carboxylic acidic monomers such as acrylic acid, methacrylic acid, itaconic acid, crotonic acid, mono -$C_1$ to $C_4$-alkyl maleate such as monomethyl maleate, monobutyl maleate, maleic anhydride, itaconic anhydride, and the like, and one or more $C_1$ to $C_8$-alkyl acrylate or methacrylate esters such as methyl acrylate, ethyl acrylate, n-propyl acrylate, isopropyl acrylate, n-butyl acrylate, isobutyl acrylate, amyl acrylate, hexyl acrylate, heptyl acrylate, 2-ethylhexylacrylate, n-oxtyl acrylate, and the like, and a vinyl aromatic monomer ingredient such as styrene, alpha-methylstyrene, vinyltoluene (a methylstyrene), or the like.

We prefer to include a $C_1$ to $C_6$ -alkyloxymethylacrylamide or -methacrylamide ingredient such as N-isobutoxymethylacrylamide, or an equivalent amount of N-isobutoxymethylmethacrylamide, but other alkyloxymethylacrylamides and -methacrylamides can be used, e.g., those having methyl, ethyl, n-propyl, tert-butyl, n-pentyl, isopentyl and the various hexyl groups in place of the isobutyl group in the acrylic resin component (A).

These acrylic polymer latex monomer materials can be combined in conventional proportions and reacted in an organic solvent or mixture thereof, or in an aqueous-/alcohol/ether solvent mixture such as n-butanol/butyl ethylene glycol ether or n-butanol/ethylene glycol monobutyl ether/water mixture in the presence or absence of a mercaptan polymer chain stopper such as $C_1$ to $C_{12}$ -alkyl mercaptan such as methyl mercaptan, hexyl mercaptan, octyl mercaptan, n-dodecyl mercaptan, to limit the molecular weight, if desired, and/or in the presence of a known reaction initiator such as any of known azobisalkylnitrile initiators such as azobis(2-methylpropanenitrile) or a peroxide initiator such as cumene hydroperoxide, tert-butyl hydroperoxide and the like, by procedures known in the art.

As prepared, the non-volatile materials (NVM) of the acrylic polymer latex component is generally about 30 to 35 percent by weight, preferably about 32 percent by weight for diluted coat usage, and 34.5% for varnish coat composition.

Other acrylic polymer components useful as components (A) of the composition of the invention are known in the art, e.g., as are described in Christenson U.S. Pat. No. 3,037,963, Vogel U.S. Pat. No. 3,117,693, Christenson et al U.S. Pat. No. 3,247,139 and Christenson et al. U.S. Pat. No. 4,097,438.

The liquified melamine/formaldehyde source resin component (B) of the compositions of this invention are known, commercially obtained materials. It can be any known monomeric or polymeric-form melamine/formaldehyde can coating resin. We prefer to use a liquid-form material referred to as a methylated melamine-formaldehyde resin sold under the trade product name Resimine® 745, available from Monsanto Company, St. Louis, Mo. Its resin solids weight percent is said to be about 100 percent, and the residual formaldehyde percent is said to be less than 0.5 percent, but other similar melamine/formaldehyde resins can be used. The formaldehyde source used to make these resins can be standard formaldehyde solution or one of its known polymerized forms such as paraformaldehyde.

The base treated phenol/formaldehyde resin component (C) of the coating composition of this invention, generally referred to herein as the phenolic resin has been known and used commercially in coating compositions for some years. Samples thereof can be obtained from the Dexter Packaging Products Division, The Dexter Corporation, 1 Water Street, Waukegan, Ill. under the name RP-912. A description of how to make such a phenol/formaldehyde resin cross-linker is described hereinbelow.

The base used in the reaction mixture can be any known, cost effective base including inorganic bases such as sodium hydroxide, potassium hydroxide, ammonia, ammonium hydroxide, or an organic base such as a trialkylamine, e.g., trimethylamine, triethylamine, tri-n-propylamine, or a alkylene polyamine such as ethylenediamine, propylenediamine, N, N, N', N'-tetramethylethylenediamine, or an alkanolamine, exemplified in the next paragraph.

A preferred composition is one in which the phenol/formaldehyde resin component (C) is one obtained by combining phenol and formaldehyde source in the presence of an N, N-di $C_1$ to $C_3$ -alkyl -$C_2$ to $C_4$ -alkanolamine as the base. Examples of such amines are N, N-dimethylethanolamine, N, N-diethylethanolamine, N, N-di-n-propylethanolamine, N, N-diisopropylethanolamine, N, N-dimethyl-n-propanolamine, N, N-diethyl-n-propanolamine, N, N-di n-propyl-n-propanolamine, N, N-dimethylisopropanolamine, N, N-dimethyl-n-butanolamine, N, N-diethyl-n-butanolamine, N, N-dimethyl-isobutanolamine, and the like. N, N-dimethylethanolamine is preferred.

The lubricant component (D) used in these can coating compositions can be any of the lubricants known in the art for inclusion in metal can coating composition purposes. The lubricant should be a polymer compatible substance which will not interfere with the uniformity of the polymer composition coated surface and still be effective to minimize mar, scratch or contact rub marks on the coated can surfaces. The curing polymer coating composition must still be sufficiently permeable to permit the lubricant in the coating composition to migrate, bloom or move to the coating surface to effect a lubricating action between adjacent cans and between cans and conveyor equipment as the cans pass along can coating conveyor equipment lines. Examples of lubricant component (D) for the can coating compositions of this invention are well known, e.g., waxes from various sources such as polyethylene oligomer waxes, carnauba wax and various natural and synthetic wax materials which are commercially available. Trade secret lubricant compositions such as Michemlube ® 160 lubricant which is believed to contain carnauba wax, and which is sold by Michelman, Inc., Cincinnati, Ohio is a preferred lubricant wax for use as a component (D) according to this invention. Other lubricants which can be used to replace all or part of a wax bearing lubricant component (D) of this invention include various silicone oil lubricants, e.g. those of the BYK 300 series silicon additives, marketed by BYK Chemical Co. of Germany.

The defoamer component (E) is added to prevent or minimize bubbles which might affect the uniformity of the coating on the surface of the can. Any conventional can coating composition defoamer can be used. However, when the new coating composition of this invention is intended to be diluted for use, e.g., as a wash, spray, roll or curtain coat it is preferred that the defoamer be an alkyl-branched alkynyl diol having from 10 to 20 carbons therein. These are compounds which feature lower alkyl branches on a aliphatic hydrocarbon chain having a triple bond between adjacent carbons in the aliphatic hydrocarbon chain and two hydroxyl (alcohol) groups in the molecule. An example of such a defoamer compounds include 2, 4, 7, 9 -tetramethyl-5-decynyl 4, 7-diol, which is commercially available under the tradename Surfynol ™ 104, available from Air Products and Chemicals Co., U.S.A.

For use in can coating compositions to be applied as a varnish coat, the above alkyl-branched alkynyl diol type defoamers can be used. Alternatively, we have found that a defoamer consisting of a petroleum derived mineral spirit liquid believed to consist predominantly of $C_{10}$ to $C_{12}$ -isoparaffinic hydrocarbons can be used. Examples of these defoamers are available from Exxon Corporation, Houston, Tex. and from Emco Chemical Distribution Co., North Chicago, Ill.

The range of percent by weight of each of the components of these can coating compositions is influenced by the selected method of application, the polymer cured film weight desired on the coated cans, the intended end use of the cans, whether or not the cans are to have decoration and/or printing applied directly to the can surfaces before or after coating with these compositions, or the cans are to be covered with paper labels, and the like.

Preferred ranges of components (A) to (E), in percent by weight of the total nonvolatile solids content of the compositions of this invention for metal can coating purposes, where the solids content, by weight of the compositions comprises 10 to 50 percent by weight of the solids content can be described as containing (A) from about 60 to 85 percent by weight of the acrylic polymer latex,
(B) from about 15 to 40 percent by weight of the melamine/formaldehyde source resin component,
(C) from about 0.5 to 20 percent by weight of the phenol/formaldehyde source resin component,
(D) from about 1 to 5 percent by weight of the lubricant component, and
(E) from about 1 to 4 percent by weight of the defoamer component.

The above ingredients (A) to (E) are combined either initially upon mixing or after some or all of the ingredients are combined with sufficient liquid selected from the group consisting of water or a water/organic liquid solvent mixture to maintain the components (A) to (E) dispersible therein. The organic liquid component, if used, can be any commonly used organic liquid used in can coating formulation, including at least partially water miscible and water immiscible organic liquids such as n-butanol, isobutanol, tert-butanol, ethylene glycol monoethyl ether, ethylene glycol monobutyl ether, known in the trade as Butyl Cellosolve ®, carbon tetrachloride, tetrachloroethylene, and the like, and mixtures thereof.

In addition, for some can coating purposes these compositions can include other ingredients such as coloring dyes where it is desired to color the metal can surface, or mineral fillers or pigments where it is desired to coat the can surface with minor amounts of such materials. Bacteriostatic compounds can also be included, if desired, but such is usually not necessary because residual formaldehyde in the composition is usually sufficient to counteract any bacterial presence problem.

After at least one metal can surface has been coated with a coating composition of this invention, the coated cans are passed, usually by conveyor equipment through heating stations for a time and at a temperature sufficient to effect a crosslinked cure of the coating composition polymer components in the can surfaces.

We have found that these coating compositions on can surfaces will cure to an extent sufficient to satisfy the above tests within about 1 minute at 350° F. PMT (peak metal temperature) to about 15 seconds at 400° F. PMT.

The invention is further exemplified by the following detailed Preparations and Examples, which are not intended to be limiting.

PREPARATION 1 —ACRYLIC LATEX COMPONENT

The acrylic polymer latex formulation component of the coating composition can be prepared in the following manner.

To a clean, dry kettle reaction vessel, blanketed with an inert gas (e.g. nitrogen) to minimize the presence of oxygen, charge 64.3 pounds of butanol and 73.2 pounds of butyl Cellosolve ® brand of ethylene glycol monobutyl ether alcohol and then set the valves attached to the reaction vessel for a direct reflux condition. Then heat the vessel and its contents to 230° F. and then add 153 grams of Vazo ® 64 brand of azobisisobutyronitrile. Then add 10 percent by volume of a premix #1 of

| POUNDS | INGREDIENTS |
|---|---|
| 30.6 | styrene |
| 16.3 | ethyl acetate |
| 66.4 | butyl acetate |
| 15.3 | methyl methacrylate |
| 48.3 | methacrylic acid |
| 365 (grams) | n-dodecyl mercaptan |
| 742 (grams) | Vazo ® 64 |

Add the remaining 90 percent of the above premix over 90 minutes with stirring while maintaining the temperature at 230°-240° F.

Hold the resulting reaction mixture for 15 minutes at 230°-240° C., and then cool the mixture to 195° C. Then while maintaining the temperature of the mixture at 185°-195° F. add over 90 minutes a premix #2 which contains the following materials:

| PARTS | INGREDIENTS |
|---|---|
| 30.6 lbs | styrene |
| 16.3 lbs | ethyl acetate |
| 66.4 lbs | butyl acetate |
| 15.3 lbs | methyl methacrylate |
| 16.1 lbs | IBMA |
| 365 gm. | n-Dodecyl mercaptan |
| 742 gm. | Vazo ® 64 initiator |

After all of the above premix #2 has been added, the mixture is held, with stirring, to ensure complete reaction, for 15 minutes. Then, while maintaining the temperature of the mixture at 185°-195° C. add in three portions at 5 minute intervals 117 gm of Vazo ® 64 initiator. The mixture is then held with stirring again for 15 minutes, and then 235 gm of Vazo ® 64 initiator is added in four portions at 20 minute intervals. The mixture is held with stirring for 20 minutes and then 117 gm of Vazo ® 64 initiator is added in four portions at 20 minute intervals. The reaction mixture is held, with stirring, for 60 minutes, and then 59 gm of Vazo ® 64 initiator and added. The reaction mixture is held for 120 minutes, with stirring. Then, a sample of the reaction mixture is tested to determine the nonvolatile material content (NVM) of the mixture. The NVM content should be 70.4 +/− 0.25 percent (30 minutes @300° F.).

Then the mixture is cooled at 130°-140° F. and neutralized with 12.3 lbs of N-dimethylethanolamine (DMEA) (to adjust the pH of the mixture to 7.1±0.1) followed by dilution with 522.0 lbs of deionized water. The resulting mixture is mixed for 30 minutes, cooled and filtered.

This component of the composition of this invention is to be stored, shipped and used at temperatures above 32° F.

This acrylic latex component of the coating composition of this invention is intended to have the following physical properties when manufacture is completed

| | |
|---|---|
| Viscosity, using RVT #6, 100 RPM at 25° C. | 320 ± 30 cps. |
| Acid Number theoretical | 31.4 |
| Wt./gallon | 8.45 ± 0.1 |
| Non-Volatile Materials (NVM) at 30' @ 300 F. | 32 ± 1% |
| pH | 7.2 ± 0.1 |

This acrylic latex polymer component contains about 6.0 percent styrene, 3.2 percent ethyl acrylate, 13.5 percent butyl acrylate, 3.0 percent methyl methacrylate, 5.0 percent methacrylic acid and 1.5 percent N-isobutoxymethyl acrylamide (N-IBMA) adjusted to contain about 32 percent non-volatile material.

PREPARATION 2 —PHENOLIC RESIN COMPONENT

Into stainless steel chemical reaction vessel equipped with valves and equipment for direct reflux of vapors and liquids from the reaction mixture there is charged 3,414 pounds of deionized water, 5,197 pounds of paraformaldehyde, 2180 pounds of N-dimethylethanolamine, 7,767 pounds of 90 percent phenol in water mixture followed by 63.5 pounds of water to wash the lines. A 15 inch vacuum is applied. The mixture is heated to 160° F. The heat is then removed and the resulting exothermic heat of reaction is allowed to carry the temperature of the mixture to 185° C. while the vacuum is adjusted to obtain a reflux action at 185° F. The mixture is held with stirring at 185°-188° F. for 60 minutes.

The vacuum is removed and the mixture is cooled to 75°-85° F. A sample of the reaction mixture is taken to check the non-volatile materials (NVM) content, and adjustment is made, if necessary, to obtain a NVM content of about 45 to 55 percent.

The resulting reaction mixture is then run through a filter press into 55 gallon drums, and sealed.

The drums are stored promptly at 40° F. maximum until use or shipment. This phenol/formaldehyde resin component material is preferably shipped and stored until use between 32°-40° F.

This phenolic resin has a viscosity of about 20 seconds maximum using a No. 4 Ford cup method, a weight per gallon of about 9.7 +/− 0.15 lbs/gal, a color of 7 maximum, a NVM content, after 3 hours at 220° F., of 45-55 percent, and a pH of 8.1 +/− 0.2.

The NVM percentage is determined using a 0.5 gram sample of the phenolic resin product, diluted with methylethylketone (MEK), and a 3 hour bake at 220° F.

EXAMPLE 1

Wash Coat Can Coat Preparation

A. Using clean stainless steel equipment about 604.831 pounds (71.57 gals.) of an aqueous organic acrylic polymer can coating dispersion as described in Preparation 1 containing above about 32 percent of non-volatile material is added to the reaction vessel. Then 192.664 pounds (23.129 gallons) of deionized water is added slowly with good agitation of the mixture, and the mixing agitation is reduced to prevent excessive foaming of the mixture (Component A).

Then 38.709 pounds (3.871 gallons) of a commercially available liquid form methylated melamine/formaldehyde resin (Resimine X745 Monsanto Co.) (Component B) is added slowly to the above mixture with good agitation and mixed for at least 30 minutes before the next step.

Then 11.612 pounds (1.197 gallons) of a liquid form phenolic resin prepared as described in Preparation 2 hereinabove (Component C) adjusted for 50 percent non-volatile materials (NVM) with water is added slowly with good agitation. The resulting mixture is mixed for at least 30 minutes before the next step.

Separately, 3.355 pounds (0.425 gallons) of 2, 4, 7, 9, -tetramethyl-5-decynyl-4, 7-diol defoamer, known as SURFYNOL® 104-100 percent, is mixed with 2.236 pounds (0.331 gallon) of N-butyl alcohol until the SURFYNOL 104 is completely dissolved.

Then the resulting SURFYNOL 104/n-butyl alcohol mixture (Component D) is added slowly to the above batch mixture with good agitation.

Then, 20.645 pounds (2.469 gallons) of a commercially carnauba wax lubricant component (Michemlube 160 TM) (Component E) is added to the batch mixture slowly with good agitation. The resulting batch mixture is mixed with good agitation for at least 30 minutes. Then, agitation of the mixture is reduced to slow speed and mixing of batch is continued for one hour to defoam the batch before sample taking.

The total weight of the mixture should be about 874.052 pounds and the volume of the mixture should be about 103 gallons. The weight per gallon is about 8.486 pounds. The percent, by volume, of solids is about 24.88%. The non-volatile materials is about 28.21 percent. The average weight per gallon is about 8.109 pound. The coating composition should be shipped and stored between 40° to 90° F.

Our standard or range for coating compositions of this type is make liquid coating compositions having the following physical properties:

| TEST | STANDARD RANGE |
| --- | --- |
| Wt./Gal. | 8.49 ± 0.15 lb./gal. |
| Wt. Solids | 26.00% ± 1 percent |
| Vol. Solids | 25.0% ± 2 percent |
| Avg. WPG Volatiles | 8.109 lb./gal. |
| Viscosity | 12 ± 2 Sec. |
| pH | 7.1 ± 0.1 |

For wash, curtain, spray or roller coating use, such a composition would be shipped to the place of use and then diluted up to approximately 1:1 by volume with water, preferably deionized water, at the place of coating application.

A batch of this composition was tested for metal can coat quality when the composition was run as a wash coat at a metal can manufacturers plant.

One and one-half truck loads of cans (34 pallets) were wash coated with this Example 1 composition (diluted at approximately 60:40, coating:water, V/V, prior to addition to the can coating machinery) on the exterior and sprayed with another proprietary buff coat composition on the interior. These cans were to be sent to a food company for food filling processing.

The coating composition and its can cured condition was considered acceptable in all respects except that can manufacturer personnel suggested addition of an odor mask ingredient to this wash coat composition. The details of coating were as follows:

| Coating Line #1 | |
| --- | --- |
| Bake/Cure Temp. | 380° F. front zone and 390° F. second zone which gave 55" at 375° F. PMT |
| Coating | Example 1 batch, hereinabove, conc. reduced 60:40 V/V |
| Reducer | Softened city water |
| Reduction | 1.5 drums soft water to 2.5 drums Example 1 composition. |
| Film Weight | 92.0-91.5 mg./can |
| Refractive Index | 25.0 |
| Can Size | 300 × 406 DWI ETP |
| IBO | 3' @ 390° F. PMT (8513A39M) 420 mg./can |

FOOTNOTES.
PMT means peak metal temperature.
DWI means drawn wall and ironed.
ETP means electrodeposited tin plate.
IBO means inside bake oven.

EXAMPLE 2

Varnish Can Coating Composition

A can coating composition which is particularly useful for application to tin coated, steel cans and can substrates, and can ends after the cans are washed, rinsed and dried to remove oils from can manufacturing operations, to provide coatings on the exterior surfaces of the cans to protect the can from rusting, rub or contact marks in processing, to protect the cans during filling operations to hold beer, beverages and food products that will receive various pasteurization and sterilization processes in retort waters varying in pH from 5.0 to 10.5.

A composition is prepared by mixing the following:

| POUNDS | GALLONS | COMPONENTS |
| --- | --- | --- |
| 640.750 | 73.649 | Acrylic latex dispersion prepared as in Preparation 1 above. |
| 166.371 | 19.973 | Deionized water |
| 44.223 | 4.422 | Melamine/formaldehyde resin. (Resimine, X-745) |
| 13.267 | 1.368 | Phenol/formaldehyde resin, prepared as in Preparation 2 above. |
| 9.288 | 1.472 | defoamer - odorless aliphatic mineral spirits (-CAS #64742-48-a; Exxon Company - USA) |
| 17.691 | 2.116 | lubricant (Carnauba wax - Michemlube 160) |
| 891.590 | 103.000 | |

The resulting coating composition has a weight per gallon of about 8.656 lbs, a percent, by volume, solids content of about 27.37 percent, a NVM content of about 31.00 percent, and an average weight per gallon volume of about 8.223. Our aim is to prepare the varnish coating compositions to have a weight per gallon of about 8.66 +/− 0.15 lbs per callous and an NVM content of 30.0 +/− 1.0 percent.

The pH of this varnish can coat composition as prepared was about 7.5 +/− 0.2.

This varnish can coat composition was tested undiluted as a DWI Process Exterior Varnish coat for cans at a can manufacturer's plant. It was concluded that this Example 2 can coat composition ran successfully as a varnish and bottom rim coating at a line speed of 1200 cans a minute on a Rutherford can coating machine. This composition passed the tests of the can manufacturer.

As a result of the performance of this Example 2 in this trial can coating run, the can manufacturer believes that replacement of the wash coat operations on the exterior of DWI food cans with a varnish coat is feasible. They have installed Rutherford coaters and pin ovens as replacements for wash coat operations on two lines in the plant, for using this composition.

The details of the coating test were as follows:

| Details: | |
|---|---|
| Coating | Example 2 composition |
| Line | #2 Modified Rotogravure Rutherford 800 with Bel Vac Bottom Rim Coater and Ross Pin Oven. |
| Gravure Roll | 85 QCH |
| Line Speed | 1200 cans per minute |
| Mandrel Speed | 3¼ wraps per can |
| Film Weight | 75, 81, 78 mg./can |
| Bakes | PIN PAQ not working, temperature tapes only |
| | A. 40–45 seconds total oven time (TOT) 430° F. setting; Approx. 420–425° F. PMT |
| | B. 40–45' TOT 450° F. Setting. Approx. 420–425° F. PMT |
| Cans | 211 × 413 DWI ETP (standard B + B can) |

The coating was run unreduced (not diluted) at an initial cold viscosity of 68 seconds Ford Cup #4. After about 2.5 hours on the coater, the material had become quite warm and the viscosity had increased to 120 seconds and become foamy. The A. bake variable was run this way.

The high viscosity coating in the Rutherford can coating machine and Bel Vac coaters was removed and replaced with fresh unreduced (undiluted) coating for the B. bake variable. No foam transfer to the can was seen on either variable, but the flow of of the B. bake variable was better.

EXAMPLE 3

Varnish Coat Formulation

A more recent varnish coat metal can coating composition, similar to Example 2 was prepared generally as described hereinabove using the following proportions of ingredients.

| | COMPONENT | AMOUNT | NVM | WT % | % ON SOLIDS |
|---|---|---|---|---|---|
| (A) | Acrylic Latex | 640.734 lbs. | 34.51% | 71.87 | 80.00 |
| | Water | 166.366 lbs. | .00 | 18.66 | — |
| (B) | Methylated Melamine/Formalde- | 44.222 lbs. | 100.00% | 4.96 | 16.00 |

| | COMPONENT | AMOUNT | NVM | WT % | % ON SOLIDS |
|---|---|---|---|---|---|
| | hyde resin (Resimine ® X745) | | | | |
| (C) | Phenol/Formaldehyde Resin | 13.267 lbs. | 50.00% | 1.49 | 2.40 |
| (D) | Mineral Spirits defoamer | 9.288 lbs. | .00 | 1.04 | — |
| (E) | Lubricant Michemlube ™ 160 | 17.691 lbs. | 25.00% | 1.98 | 1.60 |
| | TOTALS | 891.568 lbs. | — | 100.00% | 100.00% |

The specific gravity of the formulation was 1.037. The weight per gallon was 8.656 lbs. The NVM was 31.00%. The percent by volume of solids was 27.37 percent.

EXAMPLE 4

Wash Coat Formulation

A more recent can coating formulation intended for application to metal can surfaces by wash coat method, was prepared using the following proportions of components

| | COMPONENT | AMOUNT | NVM | WT % | % ON SOLIDS |
|---|---|---|---|---|---|
| (A) | Acrylic Resin* | 574.514 lbs. | 33.8% | 65.51 | 78.50 |
| | Water | 225.617 lbs. | — | 25.73 | — |
| (B) | Melamine/Formaldehyde resin (Resimine ® X745) | 38.837 lbs. | 100% | 4.43 | 15.70 |
| (C) | Phenol/Formaldehyde Resin (Dexter - RP-912) | 11.650 lbs. | 50% | 1.33 | 2.35 |
| (D) | defoamer (Surfynol ™ 104 | 3.366 lbs. | 100% | 0.38 | 1.36 |
| (E) | n-butanol | 2.243 lbs. | — | 0.26 | — |
| (E) | Lubricant (Michemlube ™ 160) | 20.714 lbs. | 25% | 2.36 | 2.09 |
| | TOTALS (Rounded) | 876.942 lbs. | — | 100.00% | 100.00% |

The specific gravity of the formulation as prepared was 1.020. The weight per gallon was 8.514 lbs. The percent, by volume, of solids was 25.36. The nonvolatile materials was 28.21 percent. The average weight per gallon by volume was 8.189 lbs.

It is contemplated that this formulation composition will be diluted, as desired, prior to its use in metal can coating operations.

I claim:

1. A water borne, water dilutable coating composition for wash coat or varnish coat application to metal containers intended for the packaging of beverages and food products comprising a mixture of
   (A) from about 10 to about 90 percent by weight of an acrylic polymer latex containing an acrylamide or methacrylamide polymer component formed from the following monomeric ingredients:

|     | INGREDIENT | PERCENT BY WT. |
| --- | --- | --- |
| (1) | Styrene | 3-10 percent |
| (2) | ethyl acrylate | 0-20 percent |
| (3) | butyl acrylate | 0-20 percent |
| (4) | methyl methacrylate | 5-8 percent |
| (5) | methacrylic acid | 3-7 percent |
| (6) | $C_1$ to $C_6$-alkyl oxymethylacrylamide or methacrylamide | 0.5-3 percent | based upon the total materials added to the acrylic polymer latex component, in a liquid medium selected from the group consisting of water and a mixture of water with an organic liquid solvent to provide from about 30 to 35 percent by weight of nonvolatile materials in said polymer latex component, (B) from about 1 to about 50 percent by weight of the total solids in the composition of a melamine/formaldehyde resin, (C) from 0.5 to 50 percent by weight of the total solids in the composition of a base treated phenol/formaldehyde source resin composition, which phenol/formaldehyde resin has a viscosity of 20 seconds maximum using a No. 4 Ford cup viscosity test method, (D) from about 0.1 to about 10 percent by weight of a coating polymer compatible lubricant uniformly dispersible in the total coating composition, (E) from about 0.1 percent to about 5 percent by weight of the total solids in the composition of a defoamer material selected from the group consisting of (1) an alkyl-branched alkynyl diol having from 10 to 20 carbon atoms and (2) aliphatic mineral spirits having $C_1$ to $C_{12}$-isaparaffinic hydrocarbons, said can coating composition containing therein sufficient liquid selected from the group consisting of water and a water/organic liquid solvent mixture to maintain the components (A) to (E) dispersible therein.

2. A composition according to claim 1 wherein the pH of the can coating composition is maintained at from about 7.0 to 7.6.

3. A composition according to claim 1 wherein the acrylic polymer latex of component (A) contains about 30-35 percent of non-volatile material and the acrylic polymer thereof contains about

|     | 3.2 percent | ethyl acrylate |
| --- | --- | --- |
|     | 13.5 percent | butyl acrylate |
|     | 3.0 percent | methyl acrylate |
|     | 5.0 percent | methacrylic acid |
| and | 1.5 percent | N-isobutoxymethyl acrylamide |

4. A composition according to claim 1 wherein the phenol/formaldehyde resin component (C) is one obtained by combining phenol and a formaldehyde source in the presence of an N, N-di-$C_1$ to $C_3$-alkyl-alkanolamine.

5. A composition according to claim 4 wherein the phenol/formaldehyde resin component (C) is one obtained by combining phenol and formaldehyde source in the presence of N, N-dimethylethanolamine.

6. A composition according to claim 1 useful especially in wash coat applications to metal can containers is one in which the defoamer component (E) is an alkyl-branched alkynyl diol having from 10 to 20 carbon atoms.

7. A composition according to claim 1 useful especially in varnish can coating operations, wherein the defoamer component (E) is one which contains aliphatic mineral spirits.

8. A composition according to claim 1 containing from about 10 to 50 percent by weight of solids therein, wherein the solids content therein contains (A) from about 60 to 85 percent by weight of the acrylic polymer latex component, (B) from about 15 to 40 percent of the melamine/formaldehyde source resin component, (C) from about 0.5 to 20 percent by weight of the phenol/formaldehyde resin component, (D) from about 1 to 5 percent by weight of the lubricant component, and (E) from about 1 to 4 percent by weight of the defoamer component.

* * * * *

UNITED STATES PATENT AND TRADEMARK OFFICE
CERTIFICATE OF CORRECTION

PATENT NO. : 5,043,380

DATED : August 27, 1991

INVENTOR(S) : Harold F. Cole

It is certified that error appears in the above-identified patent and that said Letters Patent is hereby corrected as shown below:

Example No. 4, Column 14, Line 59, insert the following footnote:

--*The acrylic polymer resin component (A) of this example formulation is similar to that described in Preparation 1 hereinabove except that one-third less butanol and one-third less Butyl Cellosolve® organic solvent were included in the mixture to cook the monomeric components.--

Signed and Sealed this

Twelfth Day of January, 1993

Attest:

DOUGLAS B. COMER

*Attesting Officer*     Acting Commissioner of Patents and Trademarks